Patented Apr. 14, 1953

2,635,095

UNITED STATES PATENT OFFICE 2,635,095

TREATMENT OF PECTOUS WASTE

Daniel P. Norman, Ipswich, Mass., assignor to New England Spectrochemical Laboratories, a partnership No Drawing. Application April 8, 1949, Serial No. 86,396

2 Claims. (Cl. 260—209.5)

This invention relates to the treatment of pectous waste and to the preparation of useful products therefrom.

The disposal of pectous waste such as orange peel presents serious difficulties because of its fermentability and the consequent undesirable odors evolved, and because of the high B. O. D. (Biological Oxygen Demand) of the material. The high water content of citrus peel and the difficulty of its removal has added to the problem. Hitherto, processes have been proposed for disposing of waste from citrus canneries by transforming it into foodstuff materials such as pectin or cattle feed, but so far as I am aware, no one prior to my invention has ever succeeded in producing from citrus waste a hard, white odorless product suitable for industrial use.

An object of this invention is to provide a simple, advantageous and effective process of treating pectous waste. A further object is to provide a process of treating pectous waste to produce industrially useful and valuable products.

In accordance with the present invention the above and other objects are attained by treating pectous waste, such as citrus waste, with a divalent alkali, with a hypochlorite, and then, preferably following a water washing, with an organic liquid selected from a large group consisting of alcohols, ketones, and hydrocarbons. In certain cases, where a product of lower quality is adequate for the purpose, the organic liquid treatment may be omitted.

Products prepared in accordance with this invention exhibit highly advantageous properties, and are hard, light colored, odorless, non-hygroscopic, and chemically and thermally stable. In cases where the organic liquid treatment is omitted, the products are hard, light colored, non-hygroscopic, and chemically stable.

For the alkali treating step, there is employed a compound of a divalent element or metal selected from the group consisting of calcium, magnesium, barium, strontium, and beryllium. The carbonates of these metals are highly advantageous for the purposes of this invention. However, the metals may be associated with other radicals, and thus, for example, the oxides and hydroxides of the metals may be employed.

The divalent alkali is preferably employed in the form of an aqueous dispersion. This dispersion must be alkaline in character. The term dispersion as used herein is intended to include mechanical suspensions, colloidal solutions, and molecular and ionic solutions. The alkali treatment is readily accomplished in a relatively few minutes, and may be carried out at ordinary room temperatures. It is understood, of course, that the reaction may be accelerated by increase in temperature. In general, a relatively small quantity of divalent alkali compound suffices to accomplish the desired effect, and it may be used in amount of the order of a fraction of one per cent by weight of the pectous waste. Larger amounts of alkali material, however, may be employed.

Following the alkali treating operation, which inter alia, renders the waste alkaline, and hardens it, excess liquid may be removed, but it is important that the treated waste be not permitted completely to dry, in order that thermal degradations which would interfere in the subsequent hypochlorite treatment may be minimized.

For the hypochlorite step, which, inter alia, effects substantial decolorization, any hypochlorite may be used. The hypochlorite is employed in the form of an aqueous dispersion, and the dispersion may be a mechanical suspension, a colloidal solution, or a molecular or ionic solution. The hypochlorite dispersion is employed in quantity sufficient to cover the alkali-hardened waste to be treated, and the materials may be at room temperature at the time of their association. The time required for decolorization may vary according to the particular hypochlorite employed, and the concentration thereof. Thus, the hypochlorite treatment has been carried out in a few minutes with an aqueous solution of sodium hypochlorite of 5% concentration.

The organic liquid employed for the purpose of this invention is selected from the large group consisting of alcohols, ketones, hydrocarbons and certain aromatic compounds. Specific examples are isopropanol, acetone, hexane, benzene, and trichloroethylene. Generally speaking, the organic liquid selected will be an oil-dissolving one, that is to say, a solvent for certain essential oils in the pectous waste to be treated.

Following the hypochlorite treatment and prior to the organic liquid treatment, the waste is preferably washed with water to remove excess hypochlorite, in order to prevent undesirable oxidizing and color effects. Thus, if the waste were to be treated with acetone without such washing, the waste would be deeply colored, apparently due to interactions of the hypochlorite, acetone, and organic compounds naturally present in the waste. With other solvents, where no reaction can take place, the washing is not necessary, although generally desirable.

The organic liquid treatment of the pectous waste may be carried out in any suitable manner, for example by batch treatment, Soxhlet type of extraction, or counter current continuous flow of organic liquid. The time of contact of the organic liquid with the material being treated may vary widely depending upon the nature of the material being treated and the results desired in the particular instance. The organic liquid treatment is preferably carried out at room temperature, but in many cases the treatment may be accelerated at elevated temperatures.

The product resulting from the above operations, which may be dried in any suitable fashion, and which may be comminuted to powdered form, is hard, light in color, non-hygroscopic, and chemically stable. The product may be utilized in a variety of applications, for example as a filler or carrier for resins or adhesives.

As an alternative to the process described above wherein the alkali and hypochlorite treatments are carried out in successive steps these operations may be carried out concomitantly. Thus, the pectous waste may be treated in a single operation with a hypochlorite of a divalent metal selected from the group consisting of calcium, barium, magnesium, strontium, and beryllium. A convenient example of such reagent is calcium hypochlorite.

I have found as a matter of experiment that if the steps outlined hereinafter are carried out in the sequence mentioned, namely, the alkali treatment, the hypochlorite treatment and the organic liquid treatment, a product of highly desired and long sought for characteristics can be produced. The chemistry involved in the process of this invention is obscure in detail because of the complexity of the organic chemical constituents of the starting materials but certain chemical reactions will be obvious. Thus the alkali treatment has the effect of rendering the pectous material alkaline in reaction and has also a hardening effect, but the action is more complex than this, however, because sodium and potassium, which are common alkalizing agents, are not operative for the purpose of this invention. In the hypochlorite step decolorizing takes place, although some pigmentation remains, but the action is more than decolorization or oxidation because hydrogen peroxide, one of the best known of decolorizing and oxidizing agents, is not operative for the purpose of this invention. The action of the organic liquid is more than that of a mere solvent for essential oils and the like and may involve reactions such as the denaturation of proteins because the product after the organic liquid treatment is much less sensitive to heat than it was prior to the treatment.

It will be understood that the principles of this invention may be applied to pectous waste in general, for example, to the pectous waste remaining from potatoes after potato starch removal, to apple pomace from cider operations, and to citrus waste remaining after juicing operations. The invention will be specifically illustrated herein, however, with respect to orange peel and pulp produced from juicing operations in the preparation of canned orange juice.

Specific examples in accordance with this invention are as follows:

Example 1

Orange peel from a cannery juicer, in the amount of 1 kilogram, was cut up in a food chopper into pieces having an approximate maximum dimension of one-eighth of an inch. The chopped peel was treated with 600 milliliters of a 1% aqueous slurry of calcium oxide having a pH of 12.7. This treatment was continued for 5 minutes and a dark, firm mass of greenish-orange solids was formed. The solids were drained but not dried. A 5¼% aqueous solution of sodium hypochlorite was added in quantity sufficient to cover the solids. Decolorization commenced immediately and the solids became white, except for a few seed shells and kernels, within a few minutes. The decolorization was accompanied by the evolution of heat. The decolorized product was filtered in a Buchner funnel, washed six times with water, dried under infra-red lamps and ground in a hammer mill to pass 100 mesh. The yield was 105 grams. The final product was uniform, white, hard, and non-hygroscopic.

Example 2

Orange peel from a cannery juicer in the amount of 1 kilogram was put through a food chopper to provide pieces having a maximum dimension of about one-eighth inch. The chopped material was then covered with a clear aqueous solution of calcium hypochlorite having a pH of 11.4. The mass was allowed to stand over night and was then washed and dried. The yield was 200 grams. Except for a few seed shells and kernels, the product was firm, hard, white, non-hygroscopic, odorless, and uniform.

Example 3

A slurry of barium carbonate in water, having a pH of 9.3, was added, with stirring, to 100 grams of comminuted orange peel. After five minutes, the solids were drained and covered with a 5¼% aqueous solution of sodium hypochlorite. The solid material immediately began to decolorize, with the evolution of heat, and at the end of ten minutes was substantially white, except for a few seed shells and kernels. The treated material was then washed three times with water, drained, and dried under infrared lamps to yield 8–9 grams of a hard, substantially white, non-hygroscopic, readily ground product.

Example 4

88 pounds of fresh ground orange cannery waste were treated with a slurry of 360 grams of calcium hydroxide suspended in sufficient water to cover the peel, and were stirred for 15 minutes. The liquid was drained off by gravity from the solids and the solids were covered with 7 gallons of 5¼% sodium hypochlorite solution in enough water to cover the solids. The material was stirred and allowed to stand overnight. The product was drained, flooded four times with enough water to cover the product and drained by gravity each time. The solids were finally drained centrifugally, covered with 91% isopropyl alcohol, stirred for 1 hour with a propeller type stirrer, drained, treated twice more with fresh isopropanol with stirring for an hour each time, and then drained centrifugally and dried in an infra-red oven. The yield was 9.2 pounds of very hard, odorless, substantially white, non-hygroscopic product which was readily comminuted to pass 100 mesh.

In large scale operation, seed shells and kernels readily may be removed before the pectous waste is treated in accordance with the present invention. In such case, the substantially white product obtained by this invention will be free from non-white contaminants.

It will be seen that by this invention there has been provided a process of treating orange peel and other pectous waste which provides a simple, economical and advantageous solution to the vexatious problem of disposal.

It will further be noted that by the invention there is provided a product of industrial utility and value.

Having described my invention, what I claim as new and desire to secure by Letters Patent of the United States is:

1. In a process for disposing of pectous waste the steps which comprise treating said waste with an alkaline aqueous dispersion of a compound of a divalent metal selected from the group consisting of calcium, magnesium, barium, strontium and beryllium and, while the thus-treated material is still moist, further treating the material with an aqueous dispersion of a hypochlorite.

2. In a process for disposing of pectous waste the steps which comprise treating said waste with an alkaline aqueous dispersion of a compound of a divalent metal selected from the group consisting of calcium, magnesium, barium, strontium and beryllium and, while the thus treated material is still moist, further treating the material with an aqueous dispersion of a hypochlorite, and subsequently treating the material with an organic liquid selected from the group consisting of alcohols, ketones, and hydrocarbons.

DANIEL P. NORMAN.

References Cited in the file of this patent

UNITED STATES PATENTS

| Number | Name | Date |
|---|---|---|
| 1,991,242 | Cole et al. | Feb. 12, 1935 |
| 2,416,176 | Hoar et al. | Feb. 18, 1947 |